R. E. HELLMUND.
LOCOMOTIVE.
APPLICATION FILED OCT. 30, 1916.
1,268,971.
Patented June 11, 1918.
2 SHEETS—SHEET 2.
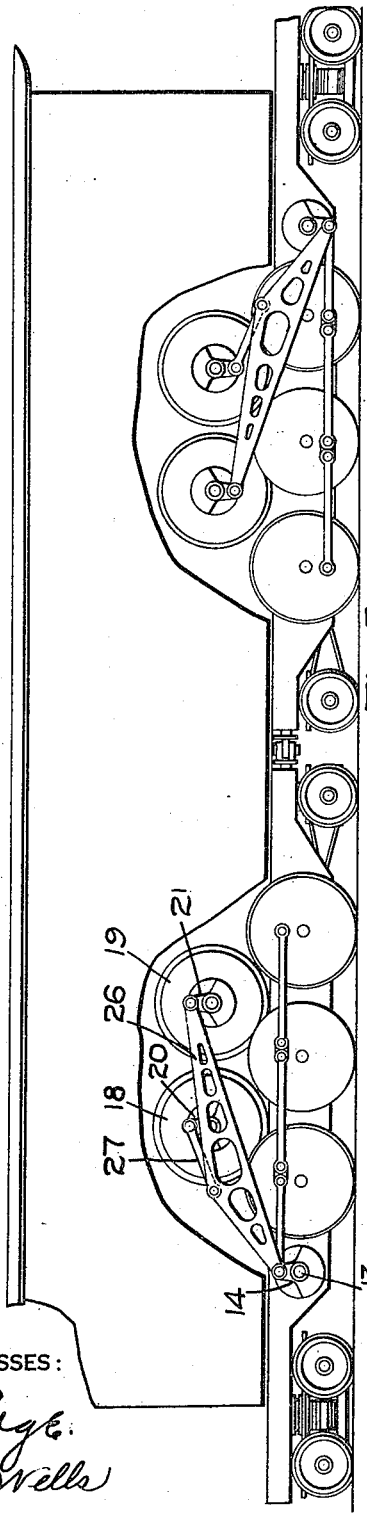
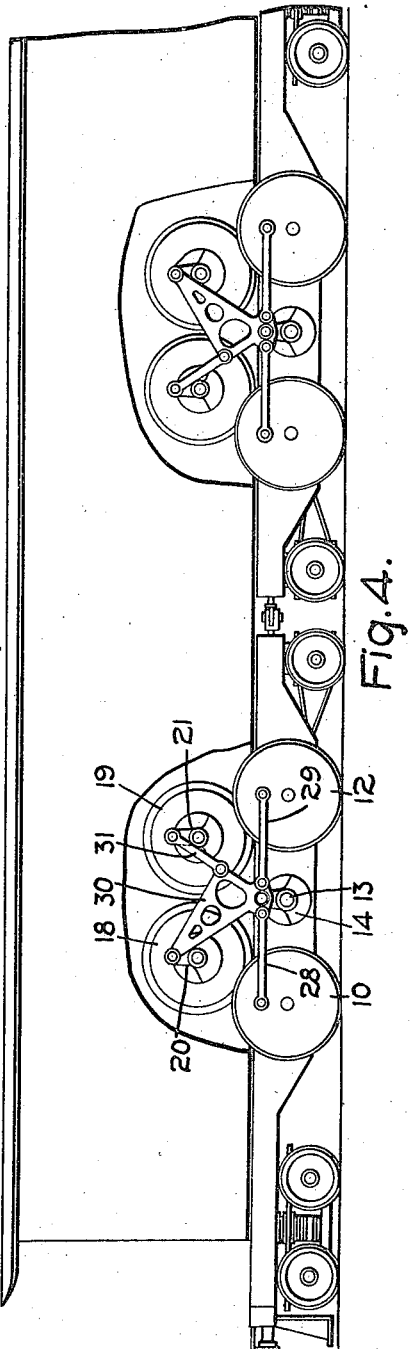
WITNESSES:
INVENTOR
Rudolf E. Hellmund.
BY
ATTORNEY

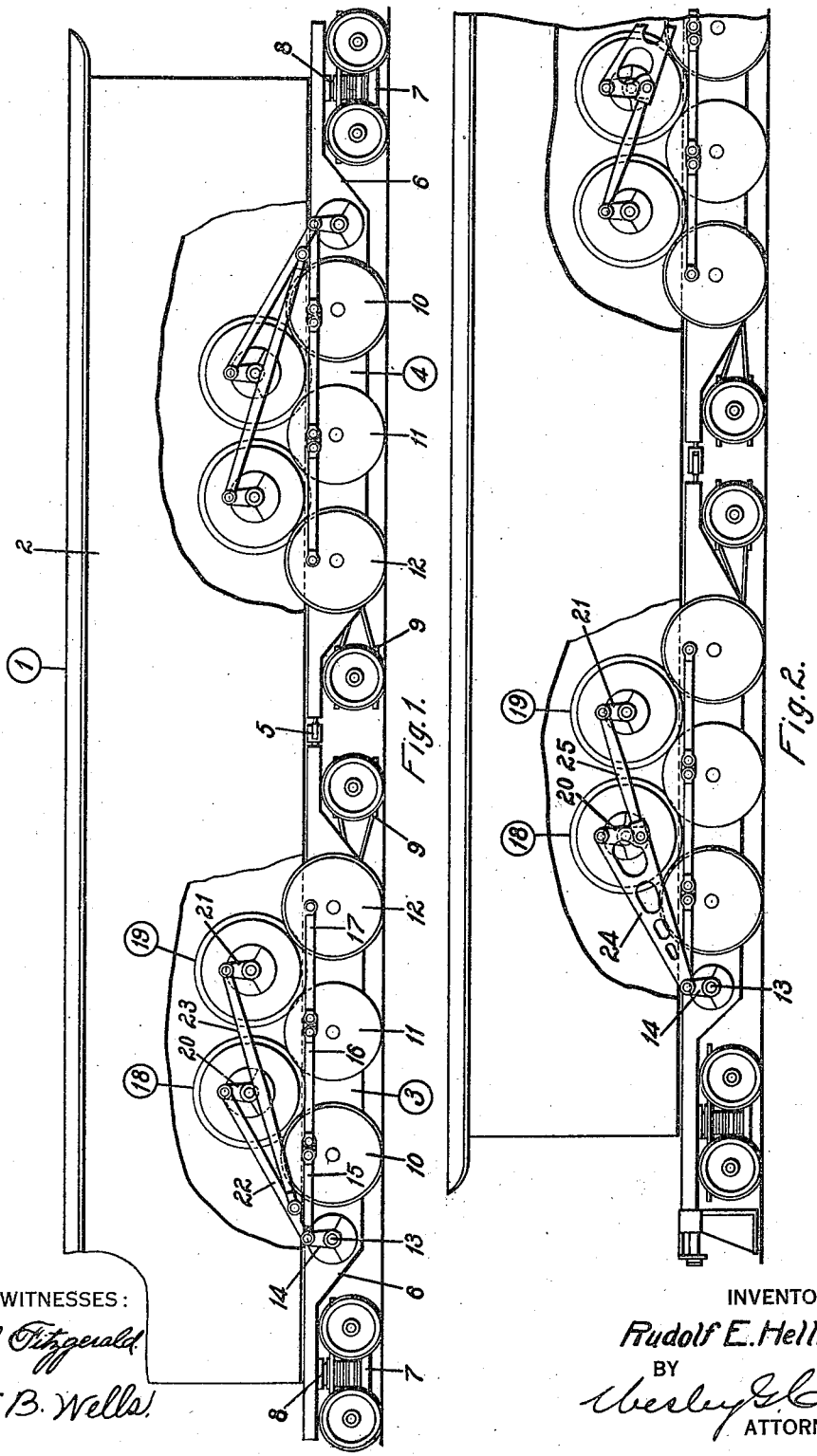

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

LOCOMOTIVE.

1,268,971.  Specification of Letters Patent.  Patented June 11, 1918.

Application filed October 30, 1916. Serial No. 128,426.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Locomotives, of which the following is a specification.

My invention relates to locomotives and particularly to electric locomotives of the side-rod type.

One object of my invention is to provide a locomotive which shall have the driving wheels and the auxiliary trucks thereof so disposed relative to the propelling motors as to insure good tracking and guiding characteristics.

Another object of my invention is to provide a locomotive of the above-indicated character which shall have the propelling motors thereof mounted above the driving wheels, a jack shaft located adjacent to the driving wheels and connected thereto by side rods, a rigid member connecting one propelling motor to the jack shaft and a flexible means connecting a second one of the motors to the jack shaft.

More specifically, my invention consists of a locomotive embodying a cab, and two articulated running gears. Each of the running gears embodies an outer four-wheel pivotal truck, an inner two-wheel radial truck, and pairs of driving wheels disposed between the pivotal and the radial truck. A jack shaft is located adjacent to the driving wheels and is connected thereto by side rods. One of the propelling motors, which is mounted above the driving wheels, is connected to the jack shaft by a rigid member, and another of the motors is connected to the jack shaft by a flexible means.

In the accompanying drawings, Figure 1 is a partial elevational view of a locomotive constructed in accordance with my invention; and Figs. 2, 3 and 4 are similar views illustrating modifications of my invention.

Referring to Fig. 1 of the drawings, a locomotive 1 embodies a cab 2 and two articulated running gears 3 and 4, which are joined together by an articulated connection 5.

Each of the articulated running gears embodies side frames 6, a pivotal outer truck 7, which is joined to the side frames by a pivotal connection 8, a two-wheel radial truck 9 and three pairs of driving wheels 10, 11 and 12, which are disposed between the pivotal truck 7 and the radial truck 9.

A jack shaft 13, having crank disks 14 mounted thereon, is disposed between the pivotal truck 7 and the pair of driving wheels 10 and is connected to the driving wheels 10, 11 and 12 by means of side rods 15, 16 and 17. Two motors 18 and 19, having crank disks 20 and 21, are mounted substantially above the pairs of driving wheels 10, 11 and 12. The crank disks 20 of the motor 18 are connected to the crank disks 14 of the jack shaft 12 by means of motor rods 22, and the crank disks 21 of the motor 18 are connected to the motor rod 22 by means of rods 23.

Like parts of the modified locomotives illustrated in Figs. 2, 3 and 4 will be designated by reference characters which conform to those used in Fig. 1 of the drawings. In Fig. 2 of the drawings, the crank disks 20 of the motor 18 are connected to the crank disks 14 of the jack shaft 13 by means of rigid triangular-shaped members 24, and the crank disks 21 of the motor 19 are connected to the triangular-shaped members 24 by means of rods 25. The locomotive illustrated in Fig. 2 differs from the locomotive illustrated in Fig. 1 essentially, in that the motor rods 22 of Fig. 1 are replaced by the triangular-shaped members, which are illustrated in Fig. 2.

In Fig. 3 of the drawings, the crank disks 21 of the motor 19 are connected to the crank disks 14 of the jack shaft 13 by means of rigid triangular-shaped members 26, and the crank disks 20 of the motor 18 are connected to the triangular-shaped members 26 by means of motor rods 27.

In Fig. 4 of the drawings, the jack shaft 13 is mounted between the pairs of driving wheels 10 and 12, in place of the driving wheels 11, and the crank disks 14 of the jack shaft 13 are connected to the driving wheels 10 and 12 by means of the side rods 28 and 29. The crank disks 20 of the motor 18 are connected to the crank disks 14 and the side rods 28 and 29 by means of triangular-shaped members 30, and the crank disks 21 are connected to the triangular-shaped members 30 by means of rods 31.

In each of the above described locomotives, one of the motors is directly connected to a jack shaft and the side rods of the locomotive by means of a rigid connecting member, and a second motor is connected to the jack shaft by means which is flexible.

The running gears of each of the above illustrated locomotives may be connected to the cab associated therewith by the usual pivotal connection or by a connection such as is disclosed in the application of George M. Eaton, Serial No. 132,091, filed Nov. 18, 1916, and assigned to the Westinghouse Electric & Manufacturing Company.

Variations in the structure and arrangement and location of parts may be made without departing from the spirit and scope of my invention, and such modifications are intended to be covered by the appended claims.

I claim as my invention:

1. In a locomotive, the combination with a single cab, of two articulated running gears supporting said single cab, each of said running gears comprising two auxiliary trucks, pairs of driving wheels disposed between said auxiliary trucks, a single jack shaft between the driving wheels and the outer auxiliary truck, and propelling means connected to said single jack shaft.

2. In a locomotive, the combination with a single cab, of two articulated running gears supporting said cab, each of said running gears comprising a four-wheel pivotal outer truck, a two-wheel radial inner truck, and driving wheels disposed between said trucks.

3. In a locomotive, the combination with a single cab, of two articulated running gears supporting said cab, each of said running gears comprising a four-wheel pivotal outer truck, a two-wheel radial inner truck, three pairs of driving wheels disposed between said trucks, a jack shaft connected to said driving wheels, and means connected to the jack shaft for propelling the driving wheels.

4. In a locomotive, the combination with a single cab, of two articulated running gears connected thereto, each of said running gears comprising a four-wheel outer pivotal truck, a two-wheel inner radial truck, three pairs of driving wheels disposed between said trucks, a single jack shaft located between said driving wheels and the four-wheel pivotal truck, side rod members for connecting the single jack shaft to all the driving wheels, and means for applying a torque to said jack shaft.

5. In a locomotive, the combination with a cab, of two articulated running gears connected thereto, each of said running gears comprising a four-wheel outer truck, a two-wheel inner truck, a plurality of pairs of driving wheels disposed between said trucks, a jack shaft located between said four-wheel truck and the pairs of driving wheels, a plurality of motors disposed above said driving wheels, and means, comprising rods, for connecting the jack shaft to the motors and to the pairs of driving wheels.

6. In a locomotive, the combination with a plurality of pairs of driving wheels, and means, comprising side rods, for joining said pairs of driving wheels, of two motors, a rigid motor rod for connecting one of said motors to a point on said side rods, and a link for connecting the second motor to said motor rod, said link being connected to a point intermediate the ends of said motor rod by a flexible connection.

7. In a locomotive, the combination with a plurality of pairs of driving wheels and means, comprising side rods, for joining the pairs of driving wheels together, of two motors disposed adjacent to said driving wheels, and means for connecting each of said motors to a point on said side-rod connecting means, one of said motors being joined to the side rods by a flexible connection and the second motor being joined to the side rods by a rigid connection, said flexible connection being located intermediate the ends of the rigid connection.

8. In a locomotive, the combination with a plurality of driving wheels, side rods for connecting said driving wheels, and two motors disposed adjacent to said driving wheels, of a flexible connection for joining one of said motors to the side rods, and a rigid means for joining the second motor to the side rods, said flexible connection being attached to said rigid means at a point intermediate the ends of the latter.

9. In a locomotive, the combination with a plurality of driving wheels, a jack shaft adjacent to said driving wheels, and side rods for connecting said jack shaft to the driving wheels, of a plurality of motors mounted above said driving wheels, motor rods for connecting one of the motors to said jack shaft, and other motor rods for connecting a second one of said motors to motor rods of the first motor.

10. In a locomotive, the combination with a plurality of driving wheels, a jack shaft adjacent to said driving wheels, side rods for connecting the jack shaft to said driving wheels, and two motors mounted above said wheels, of rod connecting means for joining one of said motors to the jack shaft, and means for connecting the second motor to said rod connecting means.

11. In a locomotive, the combination with a plurality of pairs of driving wheels, means, comprising side rods, for connecting said driving wheels, and two motors mounted above said driving wheels, of means comprising a long motor rod for connecting one of said motors to a point on said side rods, and a short motor rod for connecting the second motor to a point intermediate the ends of said first motor rod.

12. In a locomotive, the combination with a single cab, of two articulated running-gear units upon which said cab is mounted, each unit comprising inner and outer end trucks of different size, the outer end truck being the larger, driving wheels between the outer and inner trucks, a single jack shaft connected to said driving wheels, and electric motors for applying a torque to said jack shaft.

13. In a locomotive, the combination with a single cab, of two articulated running-gear units upon which said cab is mounted, each unit comprising inner and outer end trucks, driving wheels between the outer and inner trucks, a single jack shaft between the outer truck and the driving wheels and connected to the latter, electric motors disposed within the wheel base of said driving wheels, and means for connecting said motors to said jack shaft, whereby the driving thrusts are applied to the entire running gear at points outside the base defined by the driving wheels.

14. In a locomotive, the combination with a plurality of pairs of driving wheels and means, comprising side rods, for joining said pairs of driving wheels, two motors for propelling said driving wheels, a jack shaft located outside the wheel base of said driving wheels and connected to said side rods, a rigid triangular frame for connecting one of said motors to said jack shaft, and means for connecting the other motor to said frame at a point intermediate the ends thereof.

In testimony whereof, I have hereunto subscribed my name this 25th day of Oct. 1916.

RUDOLF E. HELLMUND.

Copies of this patent may be obtained for five cents each, by addressing the "Commissioner of Patents, Washington, D. C."